United States Patent [19]

Schneiter

[11] Patent Number: 4,571,516
[45] Date of Patent: Feb. 18, 1986

[54] ELECTROMAGNETIC MOTOR

[75] Inventor: Ali Schneiter, Neuchatel, Switzerland

[73] Assignee: Ebauches, S.A., Switzerland

[21] Appl. No.: 229,727

[22] Filed: Jan. 29, 1981

[30] Foreign Application Priority Data

Feb. 6, 1980 [CH] Switzerland ............................ 936/80
Nov. 5, 1980 [CH] Switzerland .......................... 8205/80

[51] Int. Cl.$^4$ ............................................ H02K 37/00
[52] U.S. Cl. ................................... 310/49 R; 310/156
[58] Field of Search ................... 310/49, 156, 162–165

[56] References Cited

U.S. PATENT DOCUMENTS 3,588,888  6/1971  Harden ............................... 310/49 X
4,205,244  5/1980  Fukushima ........................... 310/49

Primary Examiner—Donovan F. Duggan
Attorney, Agent, or Firm—Allegretti, Newitt, Witcoff & McAndrews, Ltd.

[57] ABSTRACT

The motor comprises a stator formed in one piece and having an opening formed therein, a yoke of high magnetic permeability and a coil wound round the yoke. The rotor comprises a shaft and a bar magnet. The opening has a first part all points of which are disposed at a first distance from the rotation axis of the rotor and a second part the points of which are disposed at second distances, different from the first distance, from that rotation axis. The invention is applicable particularly to stepping motors having a low consumption of electric current, e.g. for time pieces.

8 Claims, 9 Drawing Figures

ELECTROMAGNETIC MOTOR

BACKGROUND OF THE INVENTION

The present invention relates to an electromagnetic motor, for example, for use in a timepiece.

The invention is concerned particularly with a motor comprising a stator formed of two pole-pieces between which there is provided an opening, the pole-pieces being interconnected by an element of high magnetic permeability around which is wound a coil, and a rotor mounted for rotation within the said opening and having a shaft and a bar magnet which is magnetized in the direction of its axis. The sum (W) of the widths ($w_1$, $w_2$) of the clearances between the stator and the poles of the bar magnet is a periodic function $W(\theta)$ of the angular position ($\theta$) of the bar magnet, which periodic function, during each period, passes through a minimum value and a maximum value at a predetermined first angular position ($\theta m$) and a predetermined second angular position ($\theta M$) respectively of the rotor.

In such motors, in the absence of any driving pulse applied to the coil, the the rotor is subjected to a positioning torque the value of which is a function of the variable $\theta$. In the absence of any driving pulse, this positioning torque causes the rotor to assume a rest position ($\theta m$) corresponding substantially to the value of $\theta$ for which the function $W(\theta)$ has its minimum value.

In Belgian patent specification No. 550,943 there is disclosed an electromagnetic motor of the type referred to above, in which the rest position of the rotor is determined by two projecting parts provided on the wall surfaces which delimit the opening within which the rotor is located. This known motor is illustrated, diagrammatically and partly broken away, in FIG. 1 of the accompanying drawings. It can be seen from this figure that the motor comprises a circular section rotor 1 in which is incorporated a diametrically extending bar magnet 2. The stator consists of two pole pices 3a, 3b between which there is provided an opening 4. The opening 4 is delimited by two oppositely located wall surface parts 5 and 6. These wall surface parts 5 and 6 are interconnected by two zones of high magnetic reluctance which consist in this case of air gaps or clearances 7 and 8. The rest position of the rotor 1, which is shown in FIG. 1, is determined by two projections 5a, 6a provided respectively on the two wall surface parts 5, 6. In this known motor, the projections 5a, 6a are delimited by steeply inclined wall parts 9, 10. Consequently, the positioning torque which is normally applied to the rotor has, in the absence of any driving pulse, a relatively small value within a relatively wide range of values between the values $\theta m$ and $\theta M$.

According to other prior art, which is the subject of Swiss patent application No. 619,107, and is illustrated in FIG. 2 of the accompanying drawings, the stator of an electromagnetic motor is made in one piece with narrow connecting parts 11, 12 constituting, in known manner, zones of high magnetic reluctance between the two pole-pieces 3a, 3b of the stator. The opening 4 between the pole-pieces 3a, 3b is of generally cylindrical shape, being of circular cross-section except in two diametrically opposite regions where it is formed with flats 13a, 13b. This known motor has a rotor 14 of circular section which is composed entirely of magnetizable material and is magnetized in the direction of a diametral axis. Alternatively the rotor 14 could be magnetized only in an outer annular region thereof.

In this known motor, because of the circular-section shape of the magnet, the positioning torque applied to the rotor is a sinusoidal function of the angular position of the latter. Due to the characteristic form of the sinusoidal function, the amplitude of this positioning torque only attains substantial values when the rotor is in angular positions which are comparatively remote from the rest position of the latter. As a result, in order to ensure reliable starting of the rotor each time a driving pulse is applied to the coil, it is necessary that these driving pulses should be of relatively large amplitude. This results in an increase in the consumption of electric current by the motor.

An important object of the present invention is to obviate these disadvantages.

BRIEF SUMMARY OF THE INVENTION

This object is achieved in accordance with one aspect of the invention by the use, in combination with a magnetized bar, of a wall surface delimiting the opening between the pole pieces. The wall surface is of generally cylindrical form, having a circular cross-section except in a so-called asymmetrical region where parts of the said wall surface are located at a distance from the center of the circular cross-section, which is different from the distance d between the said center and other regions of the wall surface delimiting the said opening.

It has been found that due to this characteristic the positioning torque is of low or zero intensity only within a restricted range of values of $\theta$.

In one presently preferred embodiment, the said wall surface has a circular cross-section except in two asymmetrical regions located at substantially 90° with respect to each other; in one of these asymmetrical regions the said wall surface is located at a first distance ($d_1$) from the center of said circular cross-section which is greater than that (d) between said center and the circular part of said wall; in the other asymmetrical region the said wall surface is located at a second distance ($d_2$) from said center which is less than said distance (d).

It is advantageous to use a bar magnet having flat pole faces. The said bar magnet may have the form of a rectangular parallelepiped or that of a solid cylinder whose axis coincides with the axis of magnetization of the magnet.

According to one embodiment of the invention, the rotor shaft has a central part formed with a cavity and the said bar magnet is mounted in the said cavity.

The rotor shaft, which may be made in one piece of plastics material, may comprise two pivots and a pinion.

The shaft may also have a flat parallel to its axis of rotation and perpendicular to the axis of magnetization of the bar magnet.

The bar magnet may be made of samarium cobalt.

BRIEF DESCRIPTION OF THE DRAWINGS

The invention will now be described, by way of example, with reference to the accompanying drawings, in which.

DETAILED DESCRIPTION OF THE PREFERRED EMBODIMENT

Figure 2:
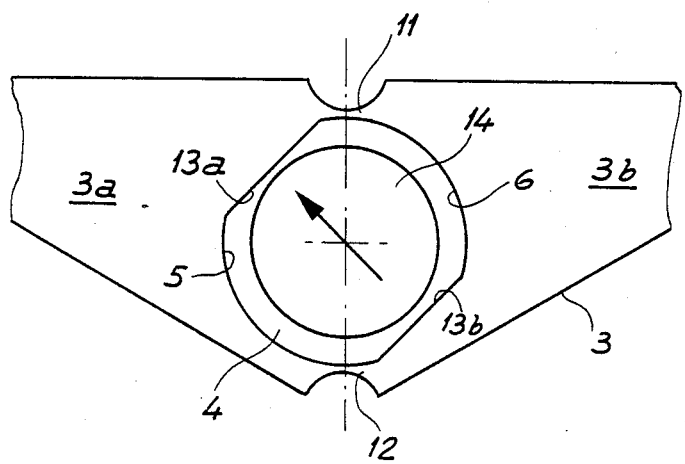
FIG. 2, which has also already been described, is a fragmentary diagrammatic plan view of a motor according to a second prior construction.
Figure 3:
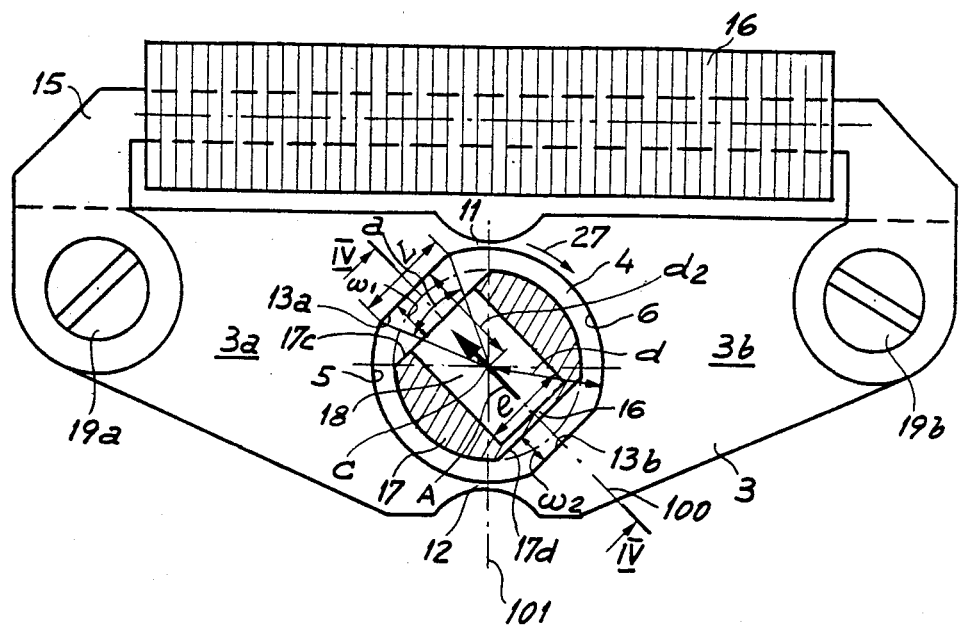
FIG. 3, is a plan diagrammatic view, partly in section taken on the line III—III in FIG. 4, of a stepping watch motor according to a first illustrative embodiment of the invention.

In FIG. 3, parts which are identical or analogous to those of FIG. 2 are indicated by the same references. The motor shown in FIG. 3 has a stator 3 made in one piece and formed with a central opening 4. The pole pieces 3a, 3b of the stator 3 are interconnected by a part 15 of high magnetic permeability. A coil 16 is wound round the part 15. The rotor of the motor of FIG. 3 has a shaft in which is incorporated a bar magnet 18. As in the case of FIG. 2, the central opening 4 is of a circular cross-section except for the provision of two flats 13a and 13b which are of the same size and are located diametrically opposite each other. The stator has, at the junction between the two pole pieces 3a, 3b, two narrow connecting parts 11, 12 which form zones of high magnetic reluctance. The pole pieces 3a, 3b are connected to the part 15 of high magnetic permeability by screws 19a and 19b.

Figures 4, 5:
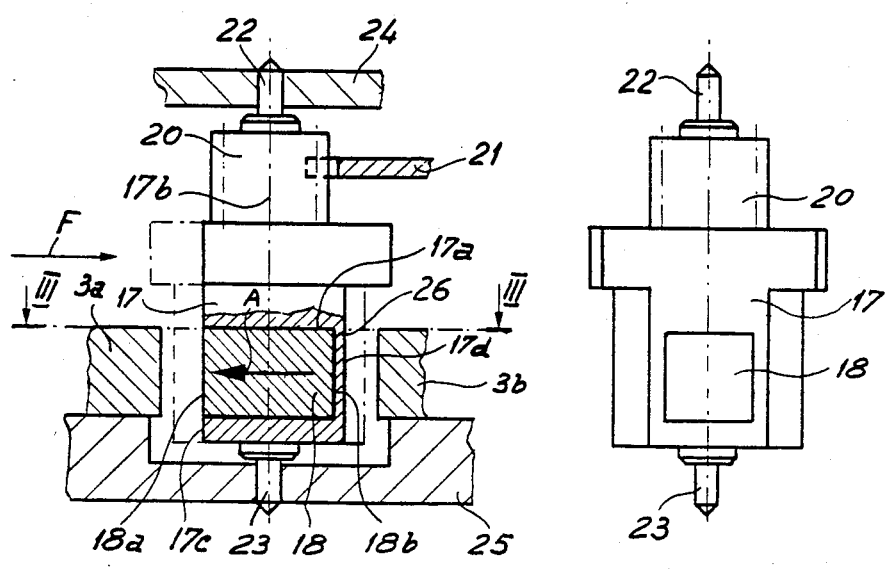
FIG. 4 is a view partly in elevation and partly in vertical section taken on the line IV—IV in FIG. 3.
FIG. 5 is a side elevation, as viewed in the direction of the arrow F in FIG. 4, of the rotor only of the motor shown in the said FIG. 4.

FIG. 4, which is a section taken along the line IV—IV in FIG. 3, will facilitate understanding of the disposition of the parts forming the rotor. This rotor comprises a shaft 17 and a bar magnet 18. The shaft 17 is made of a plastic material, preferably DELRIN (Registered Trade Mark of Dupont, Wilmington, Del.) or of HOSTAFORM (Registered Trade Mark of Hoechst, D6230 Frankfurt). The shaft 17 embodies a pinion 20 which is in mesh with a gear wheel 21 and it also has two pivot portions 22 and 23 which are rotatably mounted respectively in a bridge 24 and a plate 25 of the watch. In the shaft 17 there is formed a recess 17a in which is mounted a bar magnet 18. In the illustrative embodiment shown in FIGS. 3 to 5, the bar magnet has the shape of a rectangular parallelepiped; the long sides of this rectangular parallelepiped extend along the axis of magnetization A of the bar 18. The axis A is perpendicular to the axis of rotation 17b of the shaft 17.

The bar magnet 18 in one preferred embodiment is made of highly magnetizable material, such as the material marketed by Brown & Boveri of Baden under the designation "Rokama 20". This "Rokama 20" is a samarium-cobalt alloy.

The shaft 17 has a flat 17c parallel to the axis 17b. The recess 17a in which the bar magnet 18 is mounted is a blind hole such that there is a wall 26 at the bottom end thereof which, in the embodiment shown in FIGS. 3 to 5, is a flat wall having a second flat surface or a second flat 17d opposite and parallel to the flat 17c of the shaft 17.

The shaft 17 and its pinion 20 may easily be produced by modern plastics injection techniques. The flat wall 26 and the flat 17c facilitate the rapid positioning of the shaft 17 and hence made possible easy assembly of the bar magnet 18 with the said shaft 17. The parallelpiped shape of the bar magnet 18 constitutes an important simplification as compared with known motors; this parallelpiped shape indeed greatly simplifies the production of the bar 18. The bar 18 can thus be cut to shape easily by means of a diamond saw. The fixing of the bar 18 in the recess in the shaft 17 is also simplified, and can be achieved by engaging the said bar as a force fit in the recess 17a, by glueing it in with the aid of a thermoplastic adhesive, or by riveting. For this last-mentioned operation, all that is necessary is to upset the material of the flat 17c to a small extent over the bar 18.

The motor shown in FIGS. 3 to 5 operates as follows. In the rest position, the bar magnet 18, due to its being magnetized in the direction of the axis A, assumes substantially the position shown in FIG. 3. In this rest position, the axis of magnetization A of the bar magnet is perpendicular to the flats 13a and 13b of the central opening 4 of the stator 3. An electrical driving pulse applied to the coil 16 produces a magnetic field the lines of force of which pass through the pole pieces 3a and 3b so as to form a closed circuit. The magnetic field tends to cause the bar magnet 18 to turn in a given direction, for example in the clockwise direction idicated by the arrow 27, in FIG. 3 so as to cause the axis A of the said bar magnet 18 to assume a position parallel to an imaginary straight line interconnecting the screws 19a and 19b. This imaginary line is perpendicular to the axis 101 joining the narrow connecting parts 11 and 12. When the said driving pulse is terminated, the rotor continues its movement so as to attain a stable or rest position in which the axis A of the bar magnet 18 is perpendicular to the flats 13a and 13b but is oriented in a direction opposite to that which it occupied prior to the application of the said driving pulse to the coil 16. The rotor has thus completed a rotation of 180° about its axis.

A driving pulse of opposite polarity then causes the rotor to rotate through a further 180° in the same direction so as to reassume the position which it occupied prior the emission of the first driving pulse.

Figure 6:
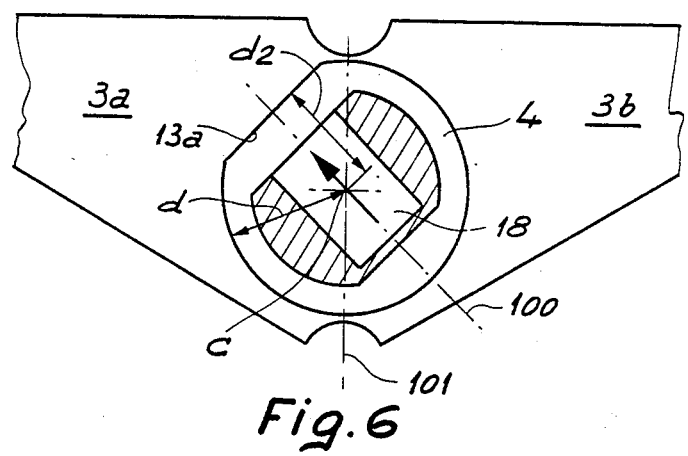
FIG. 6 is a fragmentary diagrammatic plan view of a second illustrative embodiment of the invention.

FIG. 6 shows another form of the central opening 4 which differs from that of FIG. 3 solely in that the flat 13b has been omitted and has been replaced by a circular surface part of the same radius as the remainder of the circular contour of the opening 4. It should be noted that the flat 13a of FIG. 6 of the flats 13a and 13b of FIG. 3 are disposed perpendicularly to an axis 100 which lies in the plane of the section IV—IV of FIG. 3 and encloses an angle of 45° with the axis 101 joining the two narrow connecting parts 11 and 12. In this manner it is ensured that the rest position of the rotor is that in which the magnetization axis A is inclined at an angle of 45° to the said axis 101 joining the narrow connecting parts 11 and 12 and to an imaginary line interconnecting the screws 19a and 19b. This angle of 45° enables a maximum amount of torque to be exerted on the rotor during the application of each driving pulse to the winding 16.

Figure 7:
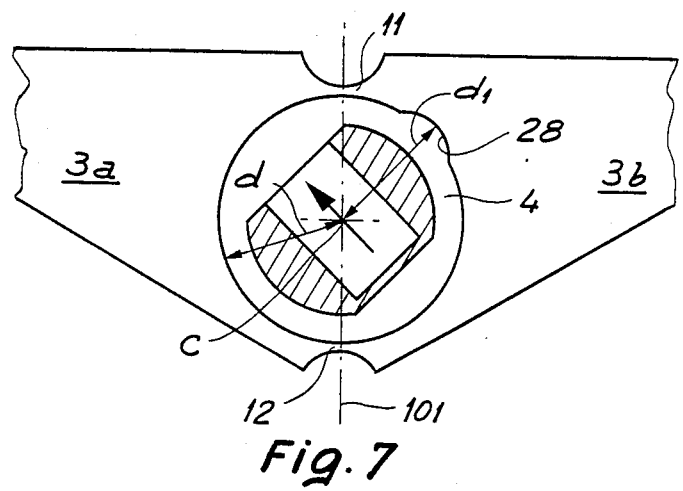
FIG. 7 is a fragmentary diagrammatic plan view of a third illustrative embodiment of the invention.

In the illustrative embodiment shown in FIG. 7, the flats on the circumference of the opening 4 are eliminated and a depression 28 is formed in the circumferential surface of the opening 4 at a position which is angularly spaced by 45° from the axis 101 joining the narrow connecting parts 11 and 12. The remainder of the wall surface that delimits the opening 4 is of a circular section.

Figure 8:
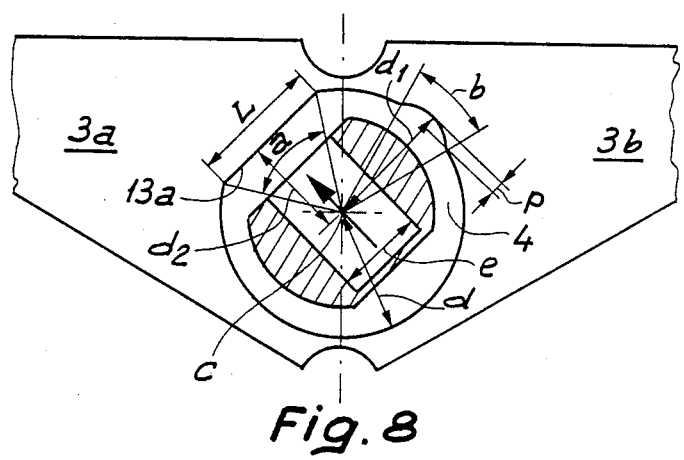
FIG. 8 is a fragmentary diagrammatic plan view of a fourth illustrative embodiment of the invention.

In the illustrative embodiment of FIG. 8 which is the presently preferred embodiment of the invention, the wall surface surrounding the opening 4 is provided with both a depression 28 and a flat 13a, the remainder of this wall surface being of circular section.

Figure 1:
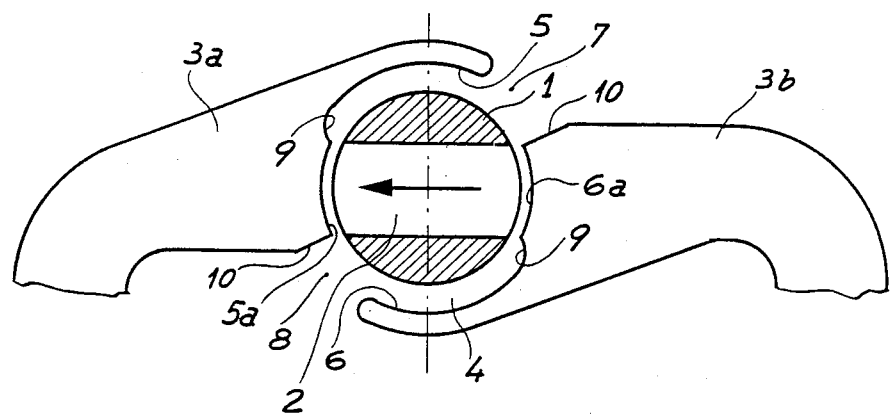
FIG. 1, which has already been described, is a fragmentary diagrammatic plan view of a motor according to a first prior construction.
Figure 9:
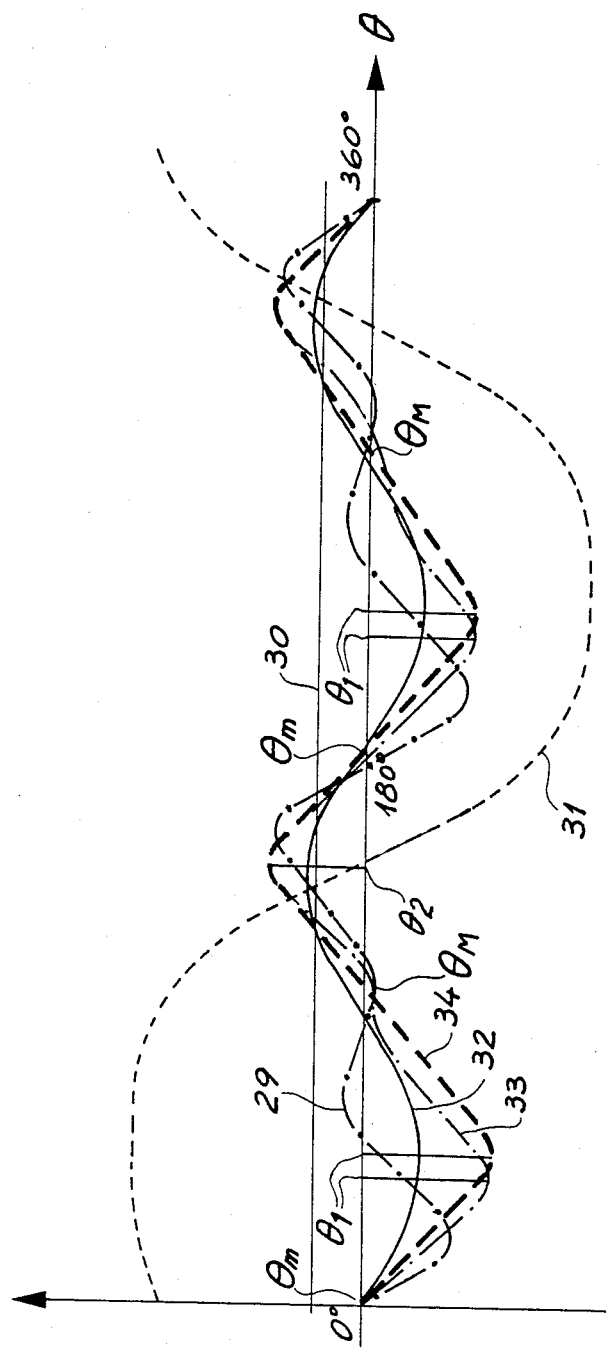
FIG. 9 is a graph illustrating diagrammatically, as a function of the angular position $\theta$ of the rotor, positioning torques obtained with the motors shown in FIGS. 1, 2, 3 and 8 as well as the torque applied to the rotor of each motor when the respective stator winding receives a pulse.

In FIG. 9, the curve 29 represents the positioning torque of the rotor of the motor of FIG. 1. In this figure, the horizontal straight line 30, located above the abscissa which indicates positions of the rotor, represents the value of an opposing torque which the rotor needs to overcome and which is due to the friction of various mechanical parts of a motion-work provided in the watch.

It can be seen from FIG. 9 that the strength of the positioning torque according to the curve 29 is less than that of the above-mentioned opposing torque over a large range of the values of $\theta$, which range includes the values of $\theta$ for which the motor torque due to the application of a driving pulse to the coil 16 is less than the said opposing torque. In FIG. 9, this motor torque is indicated by the curve 31.

The curve 32 indicates the positioning torque of the rotor of the motor of FIG. 2. It can be seen from FIG. 9 that this positioning torque is less than the abovementioned opposing torque for a range of values of $\theta$ which is more restricted than that in the case of the curve 29. Moreover, this range of values does not include the values of $\theta$ for which the torque of the motor 31 is itself less than the said opposing torque. However, as can be seen from FIG. 9, due to the existence of the opposing torque, the rotor does not always position itself in the theoretical rest position indicated in FIGS. 1, 2, 3, 6, 7 and 8 in which the positioning torque is zero, but in a position which is angularly offset towards the left in FIG. 9 and in which the positioning torque is substantially equal to the opposing torque. As can be seen from FIG. 9, due to the sinusoidal form of the curve 32, the angular offset of the actual rest position with respect to the theoretical rest position when a positioning torque has to be overcome by the rotor is relatively large, so that this actual rest position tends to correspond to a value of $\theta$ for which the torque of the motor 31 is relatively weak and may even possibly be less than the opposing torque. Consequently, the known motor shown in FIG. 2 has to be fed with driving pulses of considerable amplitude.

This disadvantage is avoided when a bar magnet is used instead of a magnet of circular shape. In FIG. 9, the curve 33 represents the positioning torque obtained with the motor of FIG. 3 and the curve 34 that obtained with the motor of FIG. 8. It can be seen from FIG. 9 that the curves 33 and 34 provide an actual rest position of the rotor which is nearer to the theoretical rest position than that which is obtained with a rotor according to FIG. 2. Consequently, in the case of the curves 33 and 34, a driving pulse of a given amplitude will produce at the rotor a motor torque which is greater than that which it would produce at the rotor of FIG. 2.

It will be observed that the portion of each of the curves 33 and 34 between the abscissa $\theta_1$ and $\theta_2$, at which the positioning torque has maximal negative and positive values. respectively, has a substantially uniform inclination. This is particularly true in the case of the curve 34.

The characteristics of the positioning torques obtained with the motors shown in FIGS. 6 and 7 have not been illustrated by curves in FIG. 9. The curves of these positioning torques are, however, generally similar to those illustrated by the curves 33 and 34, i.e., in the case of FIGS. 6 and 7 also, the curves representing the positioning torques as a function of the position $\theta$ of the rotor are each inclined at a substantially uniform angle in the region thereof between the points which correspond to the maximal positive and negative values of the positional torque.

In general, it has been found that a positioning torque having a characteristic curve which varies as a function of $\theta$ in a similar manner to the curve 34 of FIG. 9 is obtained when a bar magnet is used and the opening 4 has a first part shaped as a circular cylinder all points of which are disposed at a first distance (d) from the rotation axis of the rotor and a second part the points of which are disposed at second distances, different from the first distance, from the rotation axis.

FIGS. 3 and 6 to 8 are illustrative of embodiments which make use of particular shapes of the opening 4 which satisfy the general definition contained in the immediately preceding paragraph.

In regard to the embodiments according to FIGS. 3, 6 and 8, it has furthermore been found that the best results are obtained when the flat 13a, or the flats 13a and 13b have, in the plane of a cross-section of the opening 4, a length L of between 1/2 and 2l, where l is the width of the bar magnet 18 measured in a direction transverse to the axis A of magnetization and in the said plane of a cross-section of the opening 4, and the arc centered at C on which arc the or each flat 13a, 13b is inscribed has an angular extent "a" of between 20° and 80°.

As regards FIGS. 7 and 8, the best results are obtained when the depression 28 extends over an arc centered at C and having an angular extent "b" of between 10° and 40° and when the depth p of the depression 28 is between d/30 and d/10.

While there are shown and described, several preferred illustrative embodiments of the invention, it will be understood by those skilled in the art that other modifications may be made within the principles of the invention and the scope of the appended claims.

What is claimed is:

1. An electromagnetic motor comprising, in combination:
   a rotor mounted for rotation around a rotation axis and including a bar magnet having two poles of opposite polarity defining a magnetization axis substantially perpendicular to said rotation axis and two end faces, each of said faces being substantially flat and perpendicular to said magnetization axis; and
   a one piece stator including two pole pieces having each a first and a second end, an element of high magnetic permeability interconnecting said first ends, and a coil disposed around said element, said second ends of said pole pieces being disposed in a facing relationship and interconnected by two zones of high magnetic reluctance for defining an opening having a wall surface surrounding said rotor, said wall surface comprising a first part disposed at a substantially constant first distance from said rotation axis and a second part disposed at least a second distance, different from said first distance, from said rotation axis for producing on said rotor a positioning torque, said positioning torque being a substantially linear function of the angular position of the rotor at least between a first and a second angular position of said rotor.

2. The electromagnetic motor of claim 1, wherein said second part comprises a first surface substantially flat and parallel to said rotation axis.

3. The electromagnetic motor of claim 2, wherein said second part further comprises a second, substantially flat surface substantially symmetrical to said first flat surface with respect to said rotation axis.

4. The electromagnetic motor of claim 2, wherein said second part further comprises a depression disposed substantially at 90° from said first flat surface with respect to said rotation axis.

5. The electromagnetic motor of claims 2, 3 or 4, wherein said first surface is disposed substantially at 45° from a straight line joining said two zones, with respect to said rotation axis.

6. The electromagnetic motor of claim 5, wherein said first surface intersects a plane perpendicular to said rotation axis along a segment having a length comprised between the half and the double of the dimension of said bar magnet which is perpendicular to both said rotation and said magnetization axes, said segment further sustending an arc centered on said rotation axis in said plane and comprised between 20° and 80°.

7. The electromagnetic motor of claim 1, wherein said second part comprises a depression.

8. The electromagnetic motor of claims 4 or 7, wherein said depression extends over an arc comprised between 10° and 40° with respect to said rotation axis and has a depth comprised between 1/30 and 1/10 of said first distance.

* * * * *